US006636379B2

(12) United States Patent
Rannow et al.

(10) Patent No.: US 6,636,379 B2
(45) Date of Patent: Oct. 21, 2003

(54) DISC DRIVE IMPACTION FILTER DAMPING VIBRATIONS WHILE TRAPPING PARTICULATE CONTAMINANTS

(75) Inventors: Randy K Rannow, Loveland, CO (US); Walter Wong, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 182 days.

(21) Appl. No.: 09/896,729

(22) Filed: Jun. 28, 2001

(65) Prior Publication Data

US 2002/0021527 A1 Feb. 21, 2002

Related U.S. Application Data

(60) Provisional application No. 60/225,253, filed on Aug. 15, 2000.

(51) Int. Cl.[7] .............................................. G11B 33/14
(52) U.S. Cl. .................................................. 360/97.02
(58) Field of Search ........................... 360/97.01–97.04

(56) References Cited

U.S. PATENT DOCUMENTS

| | | | |
|---|---|---|---|
| 5,546,257 A | 8/1996 | Jennings | |
| 5,696,649 A | 12/1997 | Boutaghou | |
| 5,781,373 A | 7/1998 | Larson et al. | |
| 5,822,162 A | 10/1998 | Tannert | |
| 5,859,738 A | 1/1999 | Forehand et al. | |
| 6,005,768 A | 12/1999 | Jo | |
| 6,008,965 A | 12/1999 | Izumi et al. | |
| 6,029,793 A | 2/2000 | Tanaka et al. | |
| 6,040,957 A | 3/2000 | Konings | |
| 6,097,568 A | 8/2000 | Ekhoff | |
| 6,097,569 A | 8/2000 | Haruyama | |
| 6,097,608 A | 8/2000 | Berberich et al. | |
| 6,208,484 B1 * | 3/2001 | Voights | 360/97.02 |
| 6,296,691 B1 * | 10/2001 | Gidumal | 360/97.02 |
| 6,498,704 B1 * | 12/2002 | Chessman | 360/97.03 |

* cited by examiner

*Primary Examiner*—A. J. Heinz
(74) *Attorney, Agent, or Firm*—Merchant & Gould P.C.

(57) ABSTRACT

A particulate filter for a disc drive also functions as an acoustic noise filter and a mechanical vibration filter. The impaction filter covers substantial portions of the interior of the disc drive housing, thus reducing particulates in both radial and tangential airflow currents. The impaction filter is constructed of a soft material, such as polypropylene and modified acrylic fibers, so that particulates are bound to the surface of the impaction filter upon impact. The textured surface of the filter and the static caused by the operation of the discs in close proximity with the filter cause the particulates to tend to remain bound to the filter. Because the impaction filter covers substantial portions of the interior of the disc drive housing, rather than specific locations within the housing, the particulates in the tangential airflow currents are reduced. Moreover, the fabrication and coverage area of the impaction filter reduces acoustic noise and mechanical vibrations.

19 Claims, 4 Drawing Sheets

DISC DRIVE IMPACTION FILTER DAMPING VIBRATIONS WHILE TRAPPING PARTICULATE CONTAMINANTS

RELATED APPLICATIONS

This application claims priority of U.S. provisional application Ser. No. 60/225,253, filed Aug. 15, 2000.

FIELD OF THE INVENTION

This application relates generally to disc drives for storing data and more particularly relates to an impaction filter that reduces the number of airborne particulates, while simultaneously reducing acoustic noise and mechanical vibrations within a disc drive housing.

BACKGROUND OF THE INVENTION

Efforts to miniaturize disc drives have resulted in disc drive designs that permit greater data storage density. Recent disc drive designs increase storage density by adding more discs to a disc drive and by increasing the track density of each disc. However, as the storage density increases, the disc drive's ability to position a read/write head above a particular track becomes more difficult and more critical.

One approach to increasing the ability of the disc drive to more accurately position the read/write head is to reduce internal and/or external mechanical vibrations that may affect the operation of the disc drive. Vibrations tend to cause the disc drive to incorrectly position the read/write head. When vibrations affect the positioning of the read/write head, remedial procedures must be taken to correct the positioning. Such measures cost precious seek time and can significantly reduce a disc drive's efficiency. Various attempts have been made to reduce internal and external vibrations that may affect the performance of a disc drive. However, these approaches generally require the addition of parts into the disc drive housing, thus frustrating the goal of disc drive miniaturization.

Vibrations also cause acoustic noise that may be perceivable by a disc drive user or may cause interference with other equipment. It is well known that the mechanical vibrations that cause perceivable acoustic noise can be generated by the movement of the disc. These mechanical vibrations are known to couple across the gap between the discs and the disc drive housing, thereby enabling the mechanical vibrations to emanate from the disc drive housing as acoustic noise. Acoustic noise is another reason that disc drive designers endeavor to reduce mechanical vibrations within a disc drive.

The presence of particulates within the housing of a disc drive is a well-documented phenomenon. If the particulates reside on the surface of a disc or otherwise interfere with the operation of the disc drive read/write head, such particulates can adversely affect the reading and writing operations of a disc drive. Moreover, as a disc spins within the disc drive housing, the disc causes air to flow, generally in a radial pattern with the spin direction of the disc. One problem caused by airflow in the disc drive housing is the transportation of particulates within the housing that can cause damage to the disc or interfere with the operation of the read/write head. The airflow can cause particulates to swirl within the housing and to collect on the disc and between the read/write head and the disc surface.

One approach to reducing the presence of particulates in the disc drive housing is to place filters in strategic locations within the disc drive housing. Such filters reduce the number of airborne particulates by filtering the air and slightly restricting airflow into the portion of the housing in which the disc resides. Unfortunately, the presence of other parts, such as the actuator arm, create tangential (i.e., not radial) airflow currents in the housing. Strategically positioned filters can fail to reduce particulates transported in the tangential airflow caused by parts other than the disc. Moreover, most filtration devices are solely directed at particulate filtration and do not reduce acoustic noise or mechanical vibrations in the disc drive housing.

FIG. 1 depicts a disc drive 100 equipped with a conventional particulate filtration system. The disc drive 100 includes a base 102 to which various components of the disc drive 100 are mounted. A top cover (not shown) cooperates with the base 102 to form an internal, hermetically sealed environment for the disc drive in a conventional manner. The primary disc drive components include a spindle motor 146 that rotates one or more discs 108 at a high speed. A disc shroud 150 can be formed in the base 102, thereby providing space for the discs 108 and other disc drive components. The discs 108 can be one or more discs that are typically arranged in a vertically oriented disc pack. The vertical dimension of all of the discs in the disk pack is the disc pack height. Information is written to and read from tracks on the discs 108 through the use of an actuator assembly 110, which rotates during a seek operation about a bearing shaft assembly 144 positioned adjacent the discs 108. Mounted at the distal end of the actuator assembly 110 is a read/write head 118. During a seek operation, the track position of the heads 118 is controlled through the use of a voice coil motor 124.

A flex assembly 130 provides electrical connection paths for the actuator assembly 110 while allowing pivotal movement of the actuator assembly 110 during operation. The flex assembly includes a printed circuit board 132 to which head wires (not shown) are connected; the head wires being routed along the actuator assembly 110 to the heads 118. The printed circuit board 132 typically includes circuitry for controlling the write currents applied to the read/write head 118 during a write operation and a preamplifier for amplifying read signals generated by the read/write head 118 during a read operation. The flex assembly terminates at a flex bracket 134 for communication through the base deck 102 to a disc drive control circuit board (not shown) mounted to the bottom side of the disc drive 100. The drive control circuit provides a communication interface between the disc drive 100 and a host device (not shown), such as a personal computer. For example, the personal computer may request information that is contained on the disc or may send information to be stored on the disc.

The disc 108, typically spins in the direction of arrow A. When the disc 108 rotates, airflow is generated by the rotation. Most of the airflow follows the radial direction of the disc and flows in the direction of arrows B and C. However, when the actuator arm 110 is extended toward the spindle motor 146, a negative pressure can be created by the airflow and a tangential airflow can be created, for example, in the direction of arrow D. It is well known that particulates can exist within the disc drive housing. Particulates can be dust, lubrication, or any other unfixed matter that may be present in the disc drive housing. Such particulates can cause damage to the disc 108, to the read/write head 118, and generally adversely affect the operation of the disc drive 100.

The disc drive 100 of FIG. 1 is equipped with two, conventional filtration devices 136, 140. A fence filter 136 has a filter element 138 that is positioned substantially perpendicular to the flat surface of the disc 108. The fence filter 136 is designed to catch particulates transported by radial airflow at the periphery of the disc 108. The fence filter 136 also can catch particulates transported by tangential airflow at the periphery of the disc 108, such as particulates carried in the direction of arrow D. However, the fence filter 136 is confined to a particular area of the disc drive housing and cannot collect particulates in radial or tangential airflow in other areas of the disc drive housing. A circulation filter 140 has a filter element 142 that is also positioned substantially perpendicular to the flat surface of the disc 108. The circulation filter 140 is designed to catch particulates transported by radial airflow at the periphery of the disc 108. The circulation filter 140 is incapable of catching particulates transported by tangential airflow at the periphery of the disc 108. Moreover, the circulation filter 140 is confined to a particular area of the disc drive housing and cannot collect particulates in radial airflow in other areas of the disc drive housing.

Therefore, there is a need in the art for a particulate filter that reduces particulates in circular, radial, and tangential airflow currents. The particulate filter should also function to reduce mechanical vibrations and acoustic noise in the disc drive.

SUMMARY OF THE INVENTION

Against this backdrop, embodiments of the present invention have been developed. An embodiment of the present invention incorporates the functionality of a particulate filter with that of an acoustic noise filter and a mechanical vibration filter. An impaction filter covers a selected portion of the surface area of the interior of the disc drive housing. The impaction filter is placed in an area of the disc drive housing in which the particulates will most likely be moving, thereby maximizing the probability of trapping the particulates. The position of the impaction filter with respect to the disc drive housing reduces particulates in both radial and tangential airflow currents. The impaction filter is constructed of a soft material, such as a mixed polypropylene and modified acrylic fibers, so that particulates are bound to the surface of the impaction filter upon impact. The textured surface of the filter and the static caused by the operation of the disc drive in close proximity with the filter cause the particulates to tend to remain bound to the filter. Because of the location of the impaction filter within the interior of the disc drive housing, the particulates in the tangential airflow currents are reduced. Moreover, the fabrication and location of the impaction filter reduces acoustic noise and mechanical vibrations.

In one embodiment of the present invention, a filtration system is provided for a disc drive that includes an elongate perimeter filter constructed of an electrostatic filter damping material. The elongate perimeter filter extends along a portion of an outer perimeter of a disc between the disc and the housing of the disc drive. The damping material has a textured surface for collecting particulates that impact the textured surface. The damping material is further operative to dampen mechanical energy by reducing the coupling of mechanical energy across the gap between the disc and the disc drive housing.

In another embodiment, a filtration system is provided for a disc drive that includes an arcuate cap filter constructed of a damping material. The arcuate cap filter extends along a portion of a top surface of a disc in proximity to the outer-most edge of the disc. The damping material has a textured surface for collecting particulates that impact the textured surface. The damping material comprises polypropylene and acrylic fibers and is operative to dampen mechanical energy passing through the damping material.

In yet another embodiment of the present invention, a disc drive boundary is provided. The disc drive boundary encloses at least a portion of an outside diameter of a rotating disc pack. The disc drive boundary includes an elongate filter that is fabricated of a damping material. The elongate filter has an inner surface that is textured and is positioned in close proximity to the outside diameter of the rotating disc pack. The damping material is made of polypropylene and acrylic fibers and is operative to collect particulates and to absorb mechanical energy. The elongate filter has a height that is substantially equal to a height of the disc pack.

These and various other features as well as advantages which characterize the present invention will be apparent from a reading of the following detailed description and a review of the associated drawings.

DETAILED DESCRIPTION

Exemplary embodiments of the present invention incorporate the functionality of a particulate filter with that of acoustic noise and mechanical vibration filters. In an embodiment of the present invention, the impaction filter covers a portion of the interior of the disc drive housing, thus reducing particulates in both radial and tangential airflow currents. The impaction filter is constructed of a soft material, such as polypropylene and modified acrylic fibers, so that particulates are bound to the surface of the impaction filter upon impact. The textured surface of the filter and the static caused by the operation of the disc drive in close proximity with the filter cause the particulates to tend to remain bound to the filter. The position of the impaction filter with respect to the interior of the disc drive housing reduces particulates in all airflow paths. Moreover, the fabrication and coverage area of the impaction filter simultaneously reduces acoustic noise and mechanical vibrations.

Figure 1:
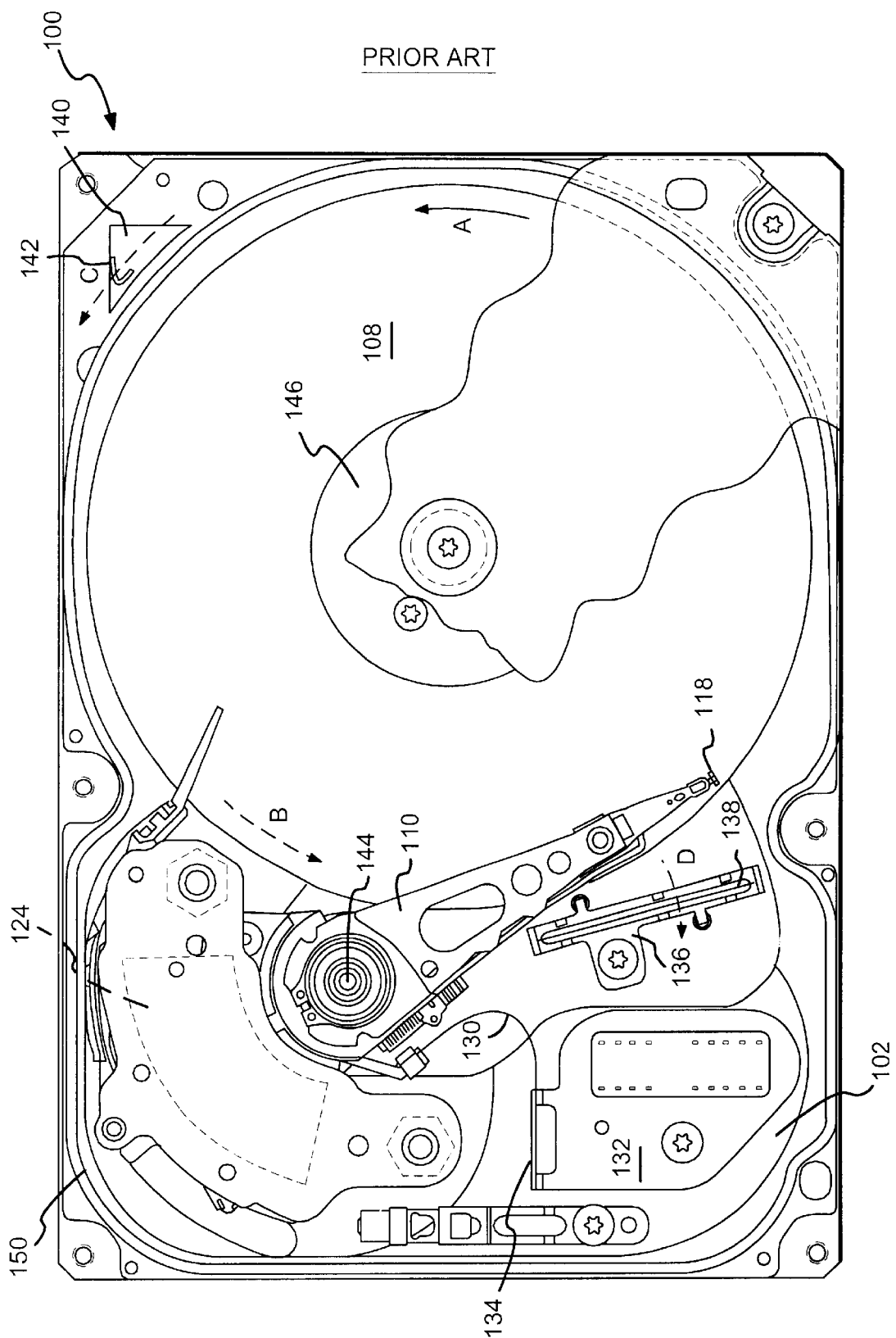
FIG. 1 is a plan view depicting the primary internal components of a disc drive equipped with a conventional particulate filtration system.
Figure 2:
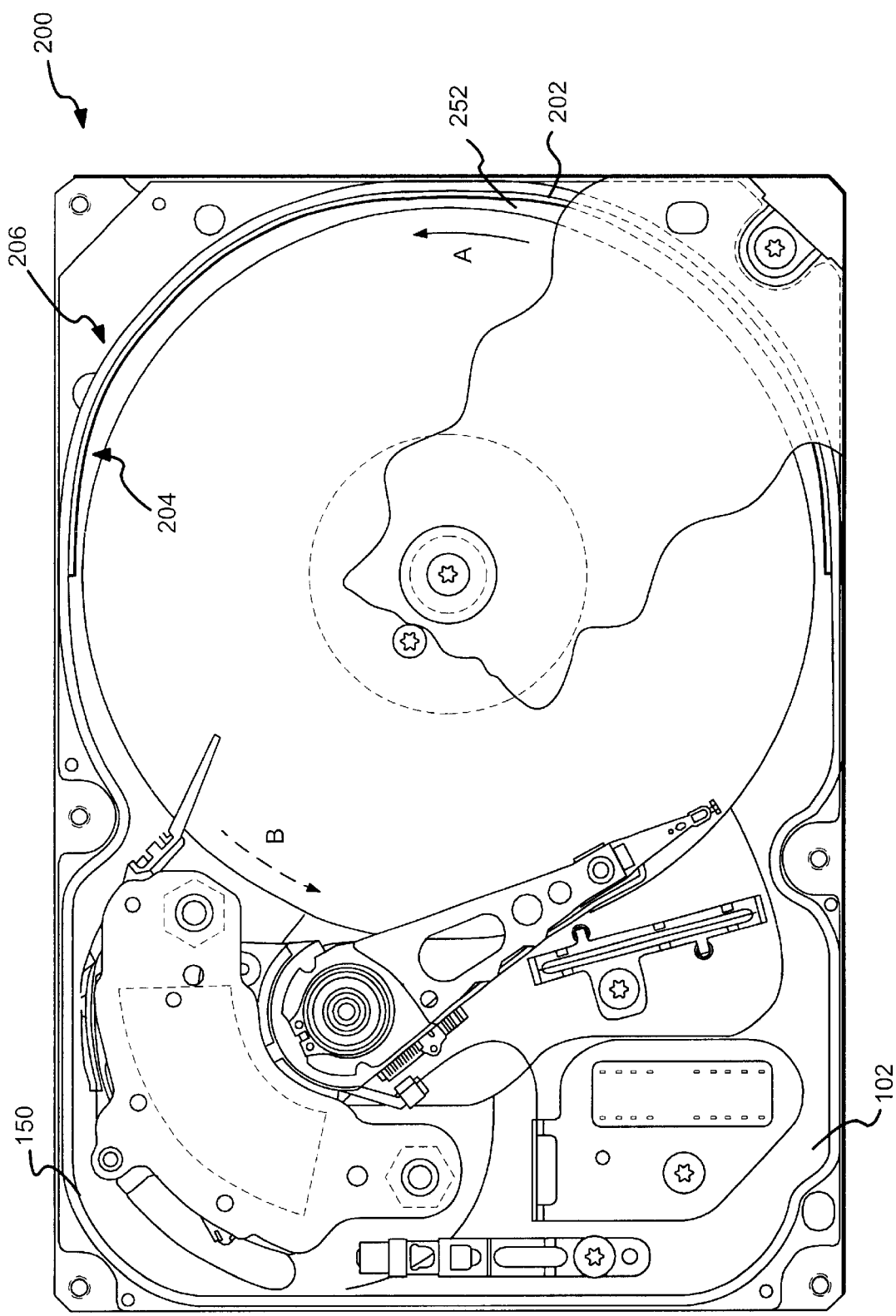
FIG. 2 is a plan view depicting the primary internal components of a disc drive incorporating a filtration system that is a preferred embodiment of the present invention.

FIG. 2 depicts the primary internal components of a disc drive incorporating a particular filter that is an exemplary embodiment of the present invention. A perimeter filter 202 surrounds at least a portion of the outer perimeter of the disc 108. In an exemplary embodiment, the perimeter filter 202 extends about 180 degrees along the outer perimeter of the disc. As described above, particulates in the disc drive housing can be carried in the direction of arrow B caused by a rotation of the disc 108 in the direction of arrow A. The perimeter filter 202 is an impaction filter, in that it can be constructed of a textured fabric material that collects particulates that impact the surface of the perimeter filter 202. Particulates impact the surface of the perimeter filter 202 as the disc pack rotates, moving the particulates radially outward and in the direction of rotation. The textured fabric material provides a damping effect that absorbs mechanical energy, such as mechanical vibrations and acoustic noise, thereby creating an energy-dissipating boundary at the outer perimeter of the discs 108. For example, the perimeter filter 202 could be constructed of a polypropylene and acrylic fiber material. In an exemplary embodiment, the perimeter filter 202 could be pre-assembled on a frame (not shown) that could be attached to the disc drive housing during the manufacturing process. The frame might function as a spring to bias the perimeter filter in an outward direction against the inside surface of the disc shroud 150. The perimeter filter 202 also uses static electricity to retain collected particles on the perimeter filter's surface. The static electricity is built up by the motion of the disc 108 in close proximity to the surface of the perimeter filter 202.

The interior surface 204 of the perimeter filter 202 can have a height that is substantially equal to the distance between the inside surface of the top cover (not shown) of the disc drive housing and the inside surface of the base 102 of the disc drive housing. The height of the perimeter filter 202 can be approximately twice the disc pack height. The outside surface 206 of the perimeter filter 202 can be adhered with an adhesive to the inside surface of the disc shroud 150 in the region in proximity with the disc 108. In an exemplary embodiment of the present invention, the inside surface of the disc shroud 150 can be modified to create more room to accommodate the thickness of the perimeter filter 202. A small gap 252 between the disc 108 and the disc shroud 150 shall be maintained to ensure no contact between the filter and the rotating disc. In addition, the textured surface of the perimeter filter 202 can cause airflow turbulence that can also reduce disc vibration. The softening of the inside surface of the disc shroud 150 reduces shearing forces that effect disc vibration. The perimeter filter 202 can be used to provide this softening function. The perimeter filter 202 can be adhered to the inner surface of the disc shroud 150 with an adhesive that becomes plastic at operating pressure. Preferably, the mechanical response of the adhesive is plastic at the appropriate operating pressure of the disc drive to maximize the shift of mechanical energy to the perimeter filter 202. Alternatively, the perimeter filter 202 can be outwardly biased, so that the spring force of the perimeter filter would maintain the perimeter filter in a fixed position relative to the disc shroud 150, thereby eliminating a need for adhesive. Mechanical vibrations are reduced by the ability of the perimeter filter 202 to absorb the mechanical energy.

Advantageously, the perimeter filter 202 also can reduce acoustic noise emanating from the disc drive 200. The generation of acoustic noise by a disc drive 200 is a well-known phenomenon. Acoustic noise can be caused by the movement of the actuator arm, the high-speed rotation of the discs, or by various other internal sources. The perimeter filter 202 tends to dampen the acoustic noise generated by the disc drive. Accordingly, the perimeter filter collects unwanted particulates, reduces mechanical vibration, and suppresses acoustic noise. Notably, all three functions are provided by a single part that can be added to a disc drive assembly cheaply and without any significant modifications to the disc drive design.

Figure 3:
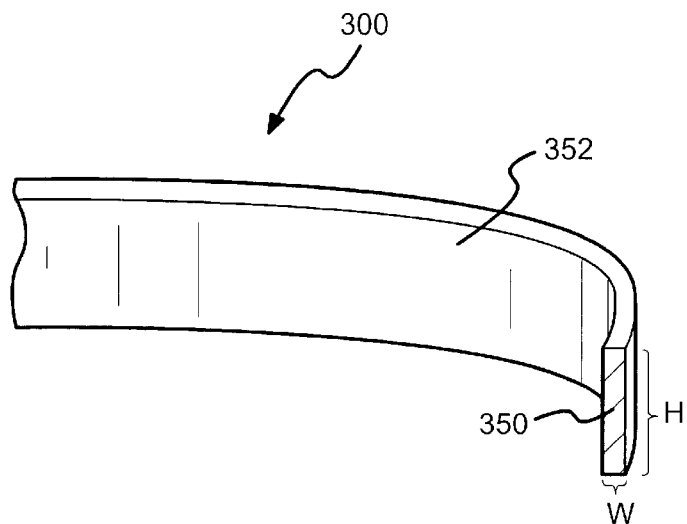
FIG. 3 is a perspective view depicting a portion of a perimeter filter of a preferred embodiment of the present invention.

FIG. 3 depicts a portion of an exemplary perimeter filter 300. As described above, the height H of the perimeter filter 300 can be substantially equal to the distance between the interior surfaces of the top cover (not shown) in the base 102 of the disc drive. However, it will be appreciated by those of ordinary skill in the art that the filter could be constructed at various heights, as constrained by conventional manufacturing requirements. For example, the filter could have a height that is greater or less than approximately twice the disc pack height, but preferably should have a height of approximately twice the disc pack height. Alternatively, the perimeter filter 300 can be constructed at a height sufficient to extend beyond the top and bottom of the disc or disc pack by approximately the thickness of a single disc. The perimeter filter 300 can be constructed of virtually any width W. However, where the volume of the disc shroud 150 is increased to accommodate the perimeter filter 300, the width of the perimeter filter may be constrained by the physical integrity requirements of the disc drive's base 102.

As described above, the perimeter filter 300 can be constructed of polypropylene and acrylic fiber material 350, to optimize the functionality of the perimeter filter 300. This polypropylene and acrylic fiber material 350 is similar to that found in the absorbent pad of an adhesive bandage. The perimeter filter 300 also can have a textured surface 352 to optimize the ability of the perimeter filter to entrap particulates upon impact.

Figure 4:
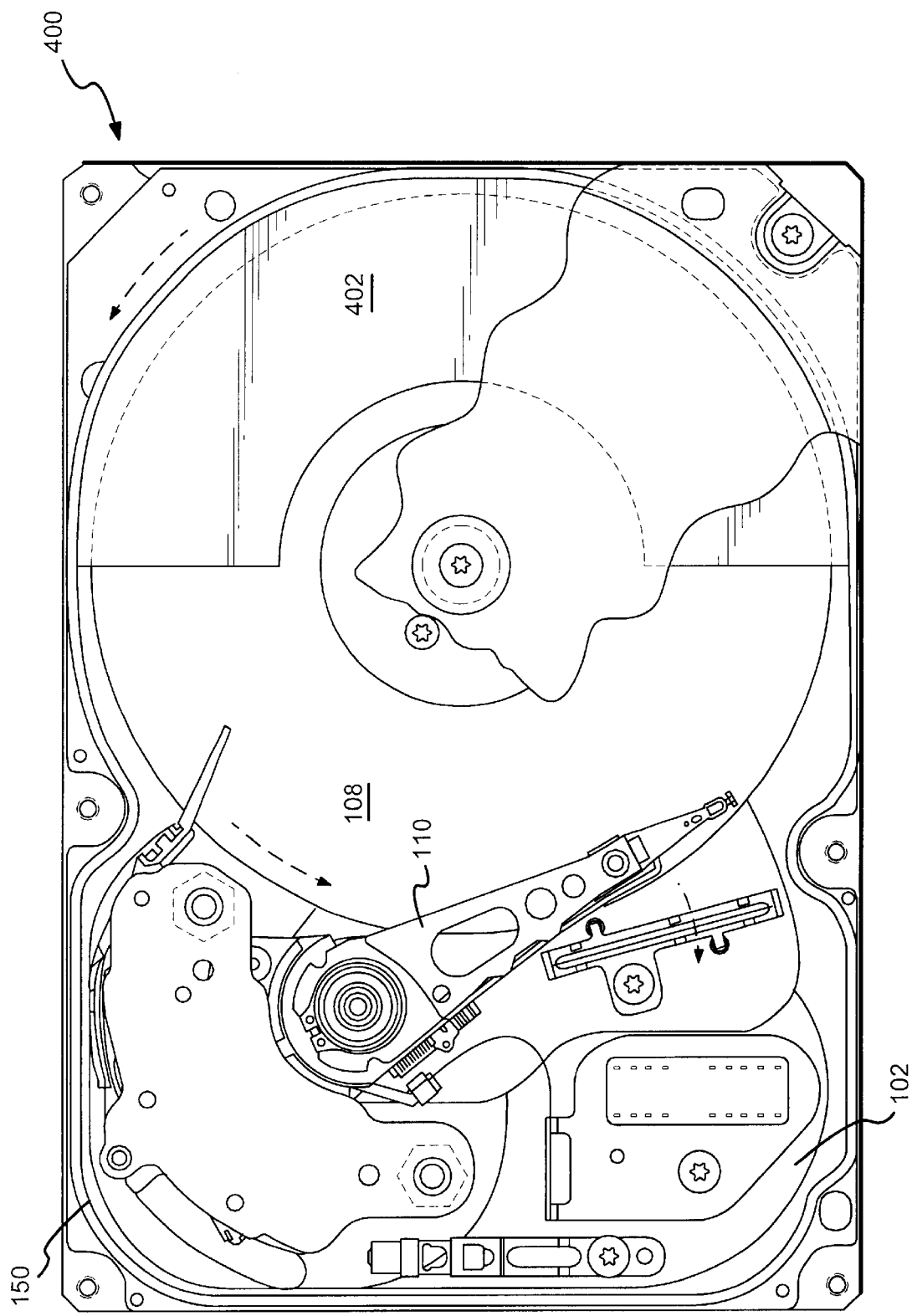
FIG. 4 is a plan view depicting the primary internal components of a disc drive incorporating a filtration system that is an alternative embodiment of the present invention.

FIG. 4 depicts a disc drive that employs a filter that is an alternative embodiment of the present invention. The disc drive 400 has been equipped with a cap filter 402. The cap filter can be constructed of essentially the same materials described in connection with the perimeter filter 202. Unlike the perimeter filter 202, however, the effective surface of the cap filter 402 is parallel to the flat surface of the discs and is located above the discs and near the outer edge of the rotating disc pack. In a particular embodiment, the cap filter 402 is near the between-disc interface. Preferably, the cap filter 402 is attached to the top cover assembly. Accordingly, the cap filter 402 can be adhered with an adhesive to the top cover (not shown) of the disc drive 400. Preferably, the mechanical response of the adhesive is plastic at the appropriate operating pressure of the disc drive to maximize the shift of mechanical energy to the cap filter. Alternatively, the cap filter can be held above the surface of the discs 108 by brackets or by any other means of securing the cap filter 402 to the disc drive's base 102 or top cover. In yet another alternative embodiment of the present invention, the cap filter 402 can be used in combination with the perimeter filter 202.

The cap filter 402 depicted in FIG. 4 has an arcuate shape that is located above the outer edge of the disc. This arcuate shape provides an opening that is large enough to permit the actuator arm 110 to move freely across the surface of the discs. In an alternative embodiment of the present invention, the cap filter could be enlarged to cover the entire surface of the disc 108, as long as the actuator arm 110 is positioned in a separate vertical plane. In yet another alternative embodiment, the cap filter can be sized to cover most of the disc surface, leaving only enough room for the actuator arm to move freely in the same vertical plane.

As described in connection with the perimeter filter, the cap filter 402 can serve multiple functions. First, the cap filter 402 can collect particulates in radial and tangential airflow. Second, the cap filter 402 can reduce acoustic noise generated by the disc drive 400. Third, the cap filter 402 can reduce mechanical vibration in the disc drive. However, the perimeter filter 202 has proven to be more effective for reducing mechanical vibration than the cap filter 402.

Figure 5:
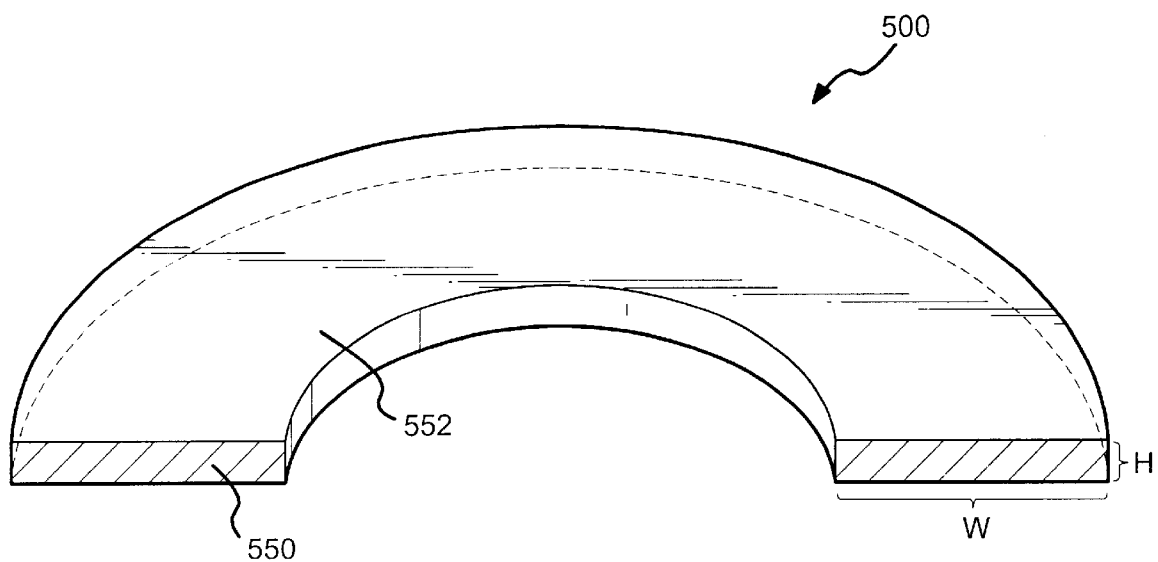
FIG. 5 is a perspective view depicting a cap filter of an alternative embodiment of the present invention.

FIG. 5 depicts an exemplary cap filter 500. As described above, the cap filter can be adhered to the disc drive's top cover. In order to reduce the overall disc drive height, the top cover can be modified to accommodate the height H of the cap filter 500. For example, the top cover could be milled-out to make room for the cap filter, thereby minimizing the additional room needed by the cap filter 500. The width W of the cap filter 500 is determined by the inside and outside diameters of the discs 108, the inside dimensions of the disc shroud 150, and the dimensions of the spindle motor 146. The cap filter can comprise a full circle or a portion thereof. However, as described above, the cap filter could be constructed as a solid semi-disc, e.g. a half-circle, rather than the partial semi-disc such as the washer-shaped semi-disc shown in FIG. 5. The cap filter could either be substantially flat like a washer or could have a substantially vertical dimension, giving rise to a donut shape or partial donut shape. The cap filter could be adhered to the top cover using an adhesive like those described in connection with FIG. 2.

As described above, the cap filter 500 can be constructed of a mixed polypropylene and acrylic fiber damping material 550, to optimize the functionality of the cap filter 500. This mixed polypropylene and acrylic fiber damping material 550 is similar to that found in the absorbent pad of an adhesive bandage or from high purity product vendors such as Donaldson Company, Inc. The filter material characteristics of an embodiment include a basis weight of approximately 3 g/cm$^2$ (grams per square centimeter), permeability of about 193 to about 228 cm/sec (centimeter per second), and a typical thickness of about 0.02 to about 0.12 cm. The cap filter 500 also can have a textured surface 352 to optimize the ability of the cap filter to entrap particulates upon impact.

In summary, embodiments of the present invention may be viewed as having a filtration system for a disc drive (such as 200) that has an elongate perimeter filter (such as 300) constructed of a polypropylene or electrostatic damping material (such as 350) and extending along a portion of an outer perimeter of a disc (such as 108). The damping material (such as 350) has a textured surface (such as 352) for collecting particulates that impact the textured surface. The damping material (such as 350) is operative to dampen mechanical energy passing through the damping material.

Alternative embodiments of the present invention may be described as having a filtration system for a disc drive that has an arcuate cap filter (such as 402) constructed of a damping material (such as 550) and extending along a portion of a top surface of a disc (such as 108). The damping material (such as 550) has a textured surface (such as 552) for collecting particulates that impact the textured surface (such as 552). The damping material (such as 550) is operative to dampen mechanical energy and preferably is made of polypropylene and acrylic fibers. Further, another alternative embodiment may include an arcuate cap filter (such as 402) and a perimeter filter (such as 300) in a disc drive.

Other alternative embodiments of the present invention may be described as having a disc drive boundary (such as 202) that encloses at least a portion of an outside diameter of a rotating disc pack (such as 108) that has an elongate filter (such as 300) fabricated of a damping material (such as 350), the elongate filter having an inner surface (such as 352) that is textured and is positioned in close proximity to the outside diameter of the rotating disc pack (such as 108). The damping material (such as 350) comprises mixed polypropylene and acrylic fibers and is operative to collect particulates and to absorb mechanical energy. In a particular embodiment, the elongate filter (such as 300) has a height that extends beyond the top and bottom of the disc or disc pack by approximately the thickness of a single disc.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A filtration system for a disc drive, comprising:
an elongate perimeter filter extending alongside and adjacent to a portion of an outer perimeter of a disc in the disc drive, constructed of a material that dampens mechanical energy, wherein the damping material has a textured surface for collecting particulates that impact the textured surface and wherein the elongate perimeter filter extends at least about 180 degrees around the outer perimeter of the disc.

2. The filtration system of claim 1, wherein the damping material absorbs mechanical energy.

3. The filtration system of claim 2, wherein the damping material absorbs mechanical vibrations.

4. The filtration system of claim 2, wherein the damping material absorbs acoustic energy.

5. The filtration system of claim 1, wherein the elongate perimeter filter has a height and a width and a substantially rectangular cross section.

6. The filtration system of claim 1, wherein the disc drive comprises a disc pack having a disc pack height and one or more discs and wherein a height of the filter is about twice the disc pack height.

7. The filtration system of claim 6, wherein the disc drive has a disc shroud around the disc pack with the elongate perimeter filter located between the disc pack and the disc shroud.

8. The filtration system of claim 7, wherein the elongate perimeter filter is adhered to an inner surface of the disc shroud.

9. The filtration system of claim 8, wherein the elongate perimeter filter is adhered to an inner surface of the disc shroud with an adhesive that is substantially plastic at an operating pressure of the disc drive.

10. The filtration system of claim 7, wherein the elongate perimeter filter is equipped with a frame that is outwardly biased, so that the elongate perimeter filter is substantially fixedly attached to an inner surface of the disc shroud by a spring force provided by the frame.

11. The filtration system of claim 1, wherein the damping material comprises polypropylene and acrylic fibers.

12. The filtration system of claim 1, wherein the elongate perimeter filter extends more than 180 degrees around the outer perimeter of the disc.

13. A data storage device having a filtration system comprising:
a particulate filter extending at least about 180 degrees around an outer perimeter of a disc mounted for rotation within the data storage device; and
a mechanical energy filter means integrated with the particulate filter for reducing mechanical vibrations.

14. The data storage device of claim 13 wherein the filter means comprises an elongate perimeter filter having a height and a width and a substantially rectangular cross section.

15. The data storage device of claim 13 wherein the data storage device comprises a disc pack having a height and one or more discs and wherein a height of the elongate perimeter filter is about twice the disc pack height.

16. The data storage device of claim 13 wherein the data storage device comprises a disc shroud around a disc pack and the filter means is adhered to an inner surface of the disc shroud.

17. The data storage device of claim 13 wherein the filter means comprises:

an arcuate cap filter above and adjacent to a top surface of the disc, constructed of a material that dampens mechanical energy and has a textured surface for collecting particulates that impact the textured surface.

18. The data storage device of claim 17 wherein the damping material comprises polypropylene and acrylic fibers.

19. The data storage device of claim 18, further comprising an elongate perimeter filter constructed of a damping material and extending along a portion of an outer perimeter of a disc.

* * * * *